(12) United States Patent
Olczak et al.

(10) Patent No.: US 8,941,837 B1
(45) Date of Patent: Jan. 27, 2015

(54) PHASED ARRAY OF COMPUTER GENERATED HOLOGRAMS FOR WAVEFORM OR SURFACE MEASUREMENT

(71) Applicant: Exelis, Inc., McLean, VA (US)

(72) Inventors: Eugene Olczak, Pittsford, NY (US); Cormic Merle, Rochester, NY (US); Greg Burdick, Rochester, NY (US)

(73) Assignee: Exelis, Inc., McLean, VA (US)

( * ) Notice: Subject to any disclaimer, the term of this patent is extended or adjusted under 35 U.S.C. 154(b) by 140 days.

(21) Appl. No.: 13/799,748

(22) Filed: Mar. 13, 2013

(51) Int. Cl.
*G01B 9/021* (2006.01)
*G02B 5/32* (2006.01)
*G01M 11/02* (2006.01)

(52) U.S. Cl.
CPC ...... *G01B 9/021* (2013.01); *G02B 5/32* (2013.01); *G01M 11/0271* (2013.01)
USPC .......................................................... 356/457

(58) Field of Classification Search
CPC .. G01B 9/021; G01M 11/00; G01M 11/0271; G01N 21/45
USPC ................... 359/1, 9, 15–20, 22, 25, 32–33; 356/457, 458
See application file for complete search history.

(56) References Cited

U.S. PATENT DOCUMENTS

| 5,691,989 | A | * | 11/1997 | Rakuljic et al. | 372/20 |
| 5,737,079 | A | | 4/1998 | Burge et al. | |
| 6,456,382 | B2 | * | 9/2002 | Ichihara et al. | 356/513 |
| 2004/0174531 | A1 | * | 9/2004 | Freimann | 356/512 |
| 2010/0177321 | A1 | * | 7/2010 | Hetzler et al. | 356/512 |

OTHER PUBLICATIONS

J.H. Burge "Applications of computer-generated holograms for interferometric measurement of large aspheric optics", Aug. 2, 1995.*
Christof Pruss "Testing Aspheres", Apr. 2008.*
J.H. Burger, "Applications of Computer-Generated Holograms for Interferometric Measurement of Large Aspheric Optics", SPIE vol. 2576, International Conference on Optical Fabrication and Testing, ed. T Kasai, P. 258-269 (Aug. 1995).

* cited by examiner

*Primary Examiner* — Kara E Geisel
*Assistant Examiner* — Maurice Smith
(74) *Attorney, Agent, or Firm* — RatnerPrestia (57) ABSTRACT

An apparatus for testing an optical surface comprising an array of holograms. The array includes a plurality of individual holograms arranged in an M×N format, in which M is the number of rows and N is the number of columns in the array. The array of holograms is positioned between the optical surface and a wavefront sensor. The array of holograms reflects a reference beam back to the wavefront sensor, and transmits a test beam to the optical surface. The array of holograms also receives the test beam reflected from the optical surface and transfers the test beam back to the wavefront sensor.

23 Claims, 12 Drawing Sheets

PHASED ARRAY OF COMPUTER GENERATED HOLOGRAMS FOR WAVEFORM OR SURFACE MEASUREMENT

FIELD OF INVENTION

The present invention is directed toward wavefront or surface measurements of an optical surface. In particular, the present invention is directed to a system and method for performing surface measurements of an optical surface using computer generated holograms (CGHs).

BACKGROUND OF THE INVENTION

Interferometry techniques are used for testing aspheric surfaces. In one test configuration, known as a null configuration, a reference wavefront and a test wavefront are formed to produce an interference pattern. Errors in the test measurement are then interpreted directly as errors in the test surface. The Hindle test is an example of a null configuration and may be used for testing convex hyperboloidal secondary mirrors. A difficulty in this approach, however, is that the auxiliary optics are often very large and difficult to fabricate. Moreover, this type of test arrangement is subject to environmental errors.

Recently CGHs have been used to measure optical surfaces or the wavefronts from the optical surfaces. The CGHs usually include patterns of lines which act as diffraction gratings. These patterns are usually written onto, or etched into glass substrates. The CGHs may be written with circular symmetry to preserve the rotational symmetry of most aspheric optics. The circular symmetry type of CGH disperses the diffraction orders along the axis, bringing them to a focus at different axial positions. See "Optical Shop Testing", second edition, K. Creath and 3. C. Wyant, D. Malacara Ed. (Wiley, N.Y., 1992), pp. 602-612, for more discussion on CGHs.

SUMMARY OF THE INVENTION

To meet this and other needs, and in view of its purposes, the present invention provides an apparatus for testing an optical surface. The apparatus includes an array of holograms and the array further includes a plurality of individual holograms arranged in an M×N format, in which M is the number of rows and N is the number of columns in the array. The array of holograms is positioned between the optical surface and a wavefront sensor. The array of holograms reflects a reference beam back to the wavefront sensor, and transmits a test beam to the optical surface. The array of holograms also receives the test beam reflected from the optical surface and transfers the test beam back to the wavefront sensor.

The array of holograms may include length and width dimensions, and the length dimension may include M holograms of sufficient number to extend a radial dimension of the optical surface, and the width dimension may include N holograms, where N is at least two rows. In some embodiments of the present invention, each row in the array may be staggered with respect to each adjacent row, and a hologram in a first row may be positioned between two holograms in an adjacent second row and forming the stagger between the first and second row.

Each hologram of the array may include a layer having a pattern of arcs of a circle and a pattern of arcs in one hologram may be phased with a pattern of arcs in an adjacent hologram.

In some embodiments of the present invention, the wavefront sensor may emit a beam of light of a predetermined field-of-view (FOV) that may have a footprint area sized smaller than, or similar to an area formed by the array of holograms. A linear translational device may move the FOV of the beam across a radial extent of the optical surface, and a rotational device may rotate the optical surface. The translational device and the rotational device may be configured to position the FOV of the beam across an entire area of the optical surface.

In some embodiments of the present invention, each hologram of the array may include opposing surfaces, and a layer on one surface may include a pattern of arcs of a circle and a layer on the opposing surface may include a wedge for reducing ghosting effect.

In some embodiments of the present invention the apparatus may include a rigid frame having two ends. One end may include an M×N array of openings, in which each opening may be configured to receive an individual hologram in the array of holograms and another end may include at least one opening configured to receive a hologram having a pattern configured for alignment of the rigid frame to the optical surface.

Embodiments of the present invention also relate to a method for testing an optical surface. The steps of this method may include directing an incident beam from a wavefront sensor toward an array of holograms which may then illuminate at least a portion of the array of holograms. Another step of the method may include modifying the incident beam by the array of holograms to produce a reference beam and a test beam and then reflecting the reference beam from the array of holograms to the wavefront sensor. Finally, yet another step may include impinging the test beam on the optical surface and then reflecting the test beam back to the wavefront sensor.

Embodiments of the present invention further relate to an apparatus for testing an optical surface. The apparatus includes an array of holograms and the array includes a plurality of individual holograms arranged in a two-dimensional matrix format. An incident beam from a wavefront sensor is positioned above the array of holograms and illuminates at least a portion of the array. The array of holograms modifies the incident beam to a reference beam and reflects back the reference beam to the wavefront sensor. The array further modifies the incident beam to a test beam. The test beam impinges on the optical surface which is positioned below the array of holograms.

It is understood that the foregoing general description and the following detailed description are exemplary, but are not restrictive, of the invention.

BRIEF DESCRIPTION OF THE DRAWINGS

The invention may be best understood from the following detailed description when read in connection with the accompanying figures, with like elements having the same reference numerals. When a plurality of similar elements are present, a single reference numeral may be assigned to the plurality of similar elements with a small letter designation referring to specific elements. When referring to the elements collectively, or to a non-specific one or more of the elements, the small letter designation may be dropped. The letter "n" may represent a non-specific number of elements. Also, lines without arrows connecting components may represent a bi-directional exchange between these components. According to common practice, the various features of the drawings are not drawn to the scale. Also, the dimensions of the various features are arbitrarily expanded or reduced for clarity. The figures are listed below.

DETAILED DESCRIPTION OF THE INVENTION

The CGHs have been used for some time to measure optical surfaces or a wavefront from optical surfaces. Typically, a CGH converts a spherical wavefront to an aspheric wavefront (see Burge et al., Proc. of SPIE, vol. 2576, 1995 and U.S. Pat. No. 5,737,079).

One limitation of CGH related interferometry testing of optical surfaces is the high cost (or unavailability) of large CGHs. This is especially true for testing large convex aspheric surfaces. In most cases, the CGH needs to be located near the surface to be tested and a single CGH must have a size as large as the surface to be tested (see FIG. 13 of Burge et al., Proc. of SPIE, vol. 2576, 1995). For example, when testing a 3-meter convex curved mirror, it is conventional to have a single CGH that also has a 3-meter diameter.

The present invention advantageously overcomes the size limitation in holograms by employing an array of holograms, also referred to herein as a PHAT. The PHAT allows for testing of mirror apertures that are not limited by the availability and expense of single large holograms. The PHAT provides the functionality of a large hologram by using smaller holograms on each element of the array making up the PHAT. As will be explained, the spatial relationships amongst the holograms of the array are calibrated by the present invention to form one large hologram. The PHAT of the present invention, therefore, acts as a single large hologram.

The present invention includes different embodiments of test systems for wavefront or surface measurements of a mirror surface or any other optical surface. Test measurements may be performed using a PHAT including an array of CGHs that cover the entire optical test surface. In addition, test measurements may be performed by using a PHAT having an array of CGHs that cover a small portion of a test surface. As will be explained, by using sub-aperture techniques, combined with mechanical motions in the test system, a complete mapping of the optical test surface obtained by the present invention. Thus, the present invention is useful for testing large optics using individual CGHs that when arrayed form a larger CGH. As will also be explained, the present invention provides calibration techniques for calibrating a PHAT using different diffraction orders and also aligning a PHAT with an optical test surface, for example.

Figure 1A:
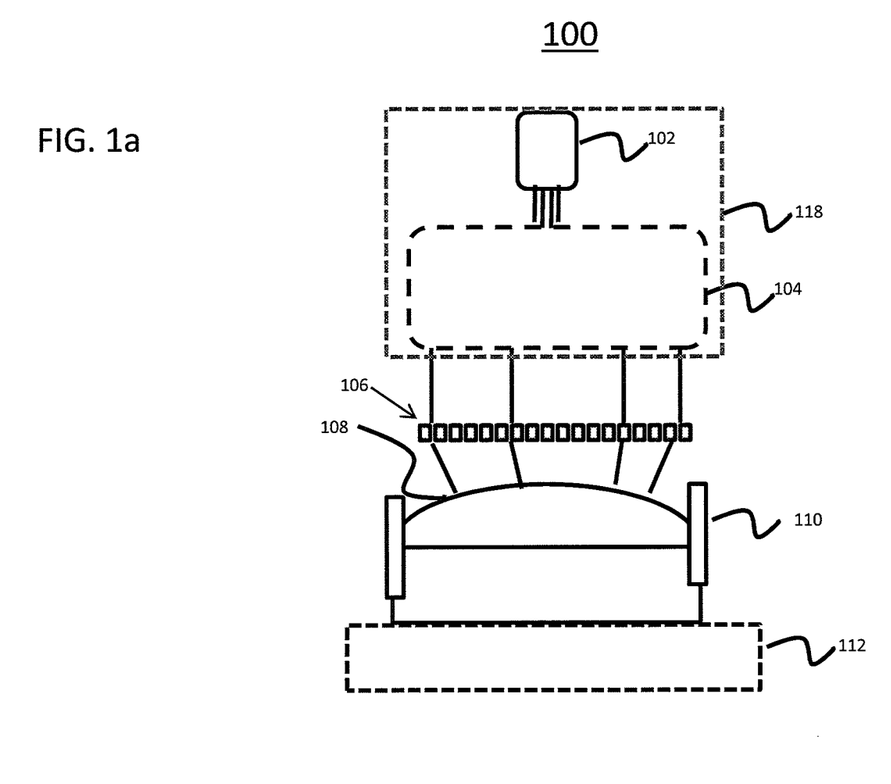
FIG. 1a is a block diagram illustrating an embodiment of the present invention depicting a system for wavefront measurements.

Referring first to FIG. 1a, there is shown a side-view of an embodiment of the present invention illustrating a test system 100 for measuring optical surfaces. The test system includes an interferometer 102, an expander 104 (optional), a PHAT 106, and an optics under test 108, in which the latter is shown held in place by an optics holder 110. Also shown in the figure are optional translation stage 118 and an optional rotational stage 112. These elements are described below.

The interferometer 102 outputs an incident beam and gathers interferometry data using a reference beam and a test beam. The reference beam is reflected from PHAT 106 back to interferometer 102, whereas the test beam is reflected from optical test piece 108, through PHAT 106 and back to the interferometer. The interferometer 102 may be, for example, a commercial Fizeau interferometer, such as those manufactured by 4D Technologies and Zygo Inc. The interferometer may also include a camera. Yet as another example, interferometer 102 may be configured as a Twyman-Greene interferometer. Alternatively, interferometer 102 may be configured as a wavefront sensor, such as a Shack-Hartman, Phase Diverse Phase Retrieval Sensor (non-interferometer sensing technology).

It will be appreciated that in Fizeau interferometry, two reflecting surfaces are used to combine reflecting beams from these surfaces to form interference fringes. One of the reflecting surfaces is a reference surface and the other surface is a test surface. The fringes produced from the reflecting beams may be used to measure the shape of the optical test surface. The reference surface may be realized by a diffractive optical element, such as a CGH. The CGH, illuminated by a source of light, may produce a reflected beam, for example, which is used as the reference beam. On the other hand, a first order diffraction beam may be directed toward the test surface. The reflected beams from both surfaces combine to generate test data in the form of interference fringes which are processed to produce surface measurements of the test surface.

The incident beam output by interferometer 102 may be a collimated coherent light beam, for example. Optionally, beam expander 104, which is disposed between the interferometer and the PHAT, may be an afocal relay (for example). The beam expander 104 may be used to increase the size of the collimated beam output from the interferometer. For example, beam expander 104 may increase the size of the collimated beam and illuminate only a portion of the PHAT or illuminate the entire array of CGHs in the PHAT, as shown in FIG. 1a.

Figures 1B, 1C, 1D:
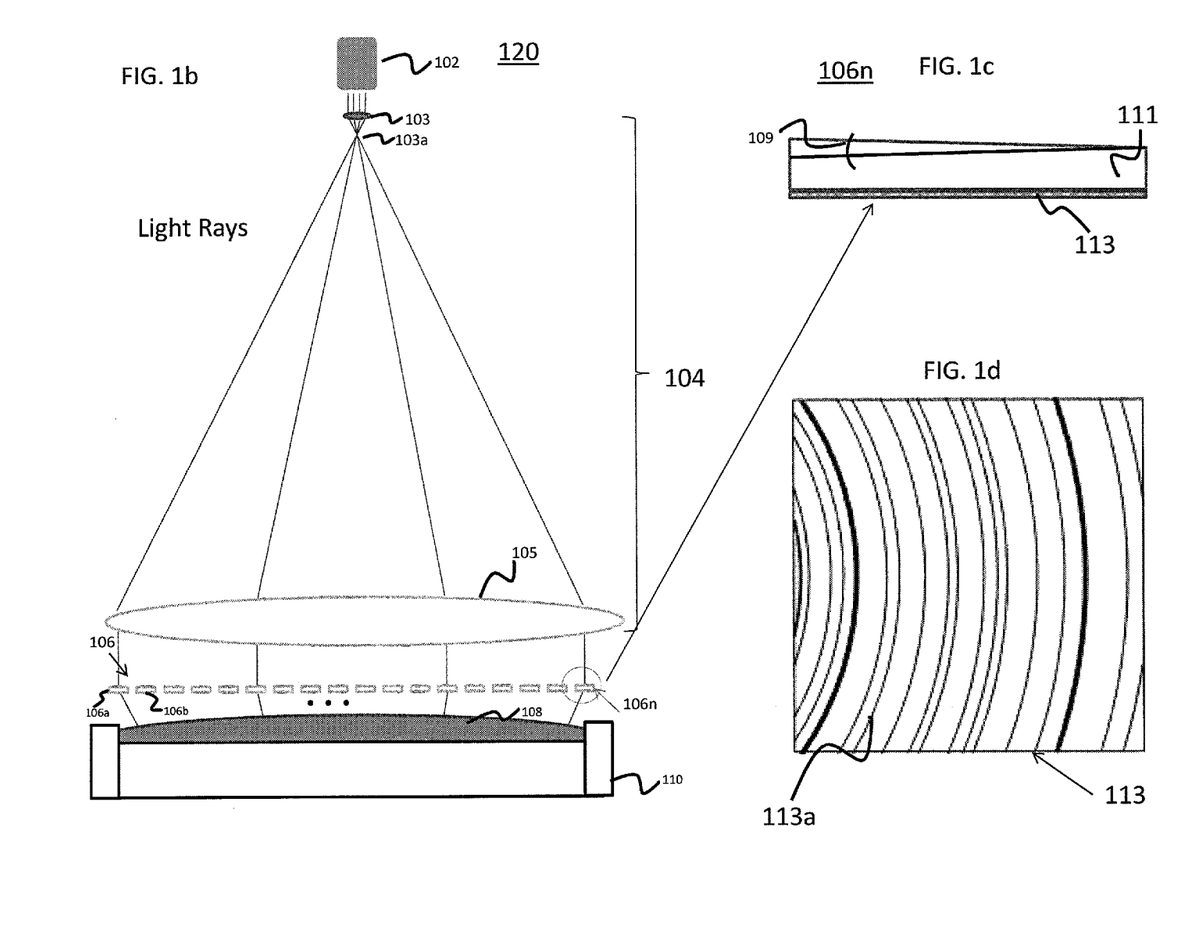
FIG. 1b is a block diagram showing an embodiment of a test system including a planar phased holographic array testplate (PHAT) covering an entire optical test piece for wavefront measurements, in accordance, with an embodiment of the present invention.
FIG. 1c is a block diagram showing a zoomed-in view of a single CGH in an array of holograms, or a phased holographic array testplate (PHAT), in accordance with an embodiment of the present invention.
FIG. 1d is a bottom view of the single CGH shown in FIG. 1c, in accordance with an embodiment of the present invention.
Figure 6A:
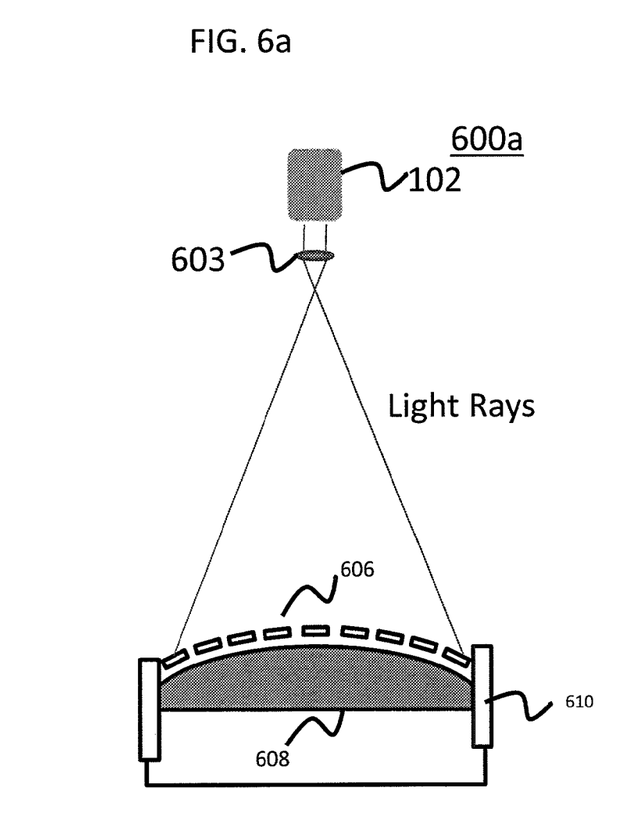
FIG. 6a is a block diagram of a test system including a non-planar PHAT disposed above a convex shaped optical test piece, in accordance with an embodiment of the present invention.
Figure 6B:
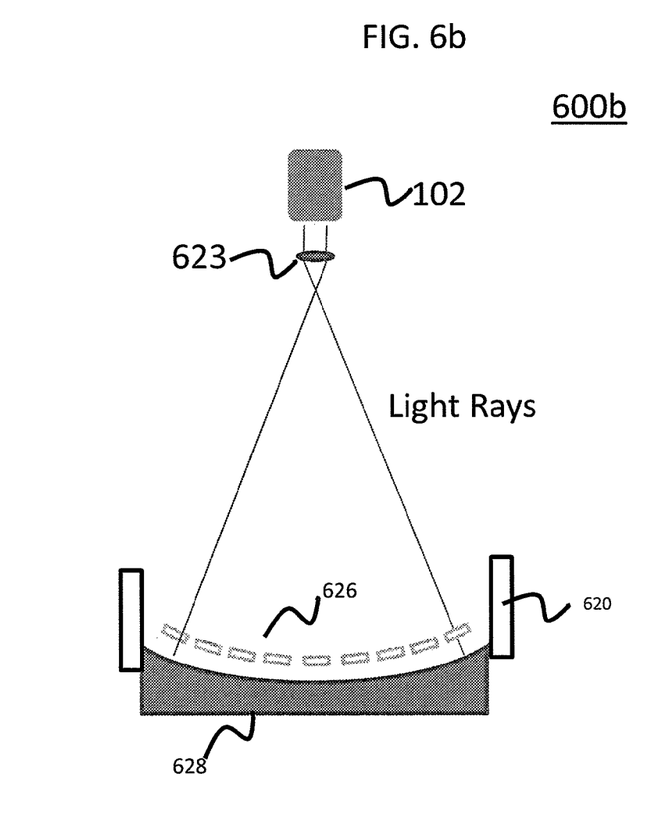
FIG. 6b is a block diagram of a test system including a non-planar PHAT disposed above a concave shaped optical test piece, in accordance with an embodiment of the present invention.

The PHAT of the present invention is a one or two dimensional (2-D) array of diffractive elements that are formed by computer generated holograms (CGHs) and may be arranged in a matrix format, for example. The diffractive elements may also be randomly scattered, for example. The 2-D array may be planar, as shown in FIGS. 1a and 1b, or may be non-planar, as shown in FIGS. 6a and 6b. It will be understood, however, that each hologram, for example, CGH 106a, 106b, etc., is a planar hologram that is used to form the array of holograms in PHAT 106 of FIG. 1a, or PHAT 606 in FIG. 6a, or PHAT 626 in FIG. 6b.

The holograms in the PHAT may be arranged in a regular grid, or alternatively, may be staggered. In one example, the PHAT in its entirety, or in a smaller portion, may be configured to bend a collimated wavefront, prior to the beam arriving at the optical test surface. Furthermore, the returning wavefront from the PHAT, prior to the beam arriving at the interferometer, may be used to provide a null wavefront. Generally, the null wavefront, also known as an aspheric wavefront is formed by a diffractive carrier. As detailed in Burge et al., Proc. of SPIE, vol. 2576, 1995, holograms are designed and manufactured with a carrier to isolate light in a desired order of diffraction, which are then passed through a spatial filter that blocks the other orders of diffraction. Most holograms use tilt, random encoding, straight lines, or power, as the carrier to fan out the orders of diffraction. Particularly, the power carrier is a type of hologram that includes a ring pattern which axially spreads out the orders of diffraction. In one example, a transmitted $1^{st}$ order diffraction power carrier is used.

The optical test piece 108 may be held in position by optic holder 110, as shown in FIG. 1a. The optic holder, which fixes the optical test piece 108, may be coupled to an optional rotational stage 112. The rotational stage 112 may be used to rotate optical test piece 108 about an axis of rotation, in a clockwise or counter-clockwise direction. The rotational motion of the optical test surface allows the array of holograms of PHAT 106 to cover an entire 360 degrees of the test surface. Furthermore, interferometer 102, together with beam expander 104, may be linearly translated in order to move the beam (formed by the interferometer and the beam expander) along a radial extent of the optical test surface. This linear translation may be performed by an optional translation stage 118, shown in FIG. 1a.

Figure 2:
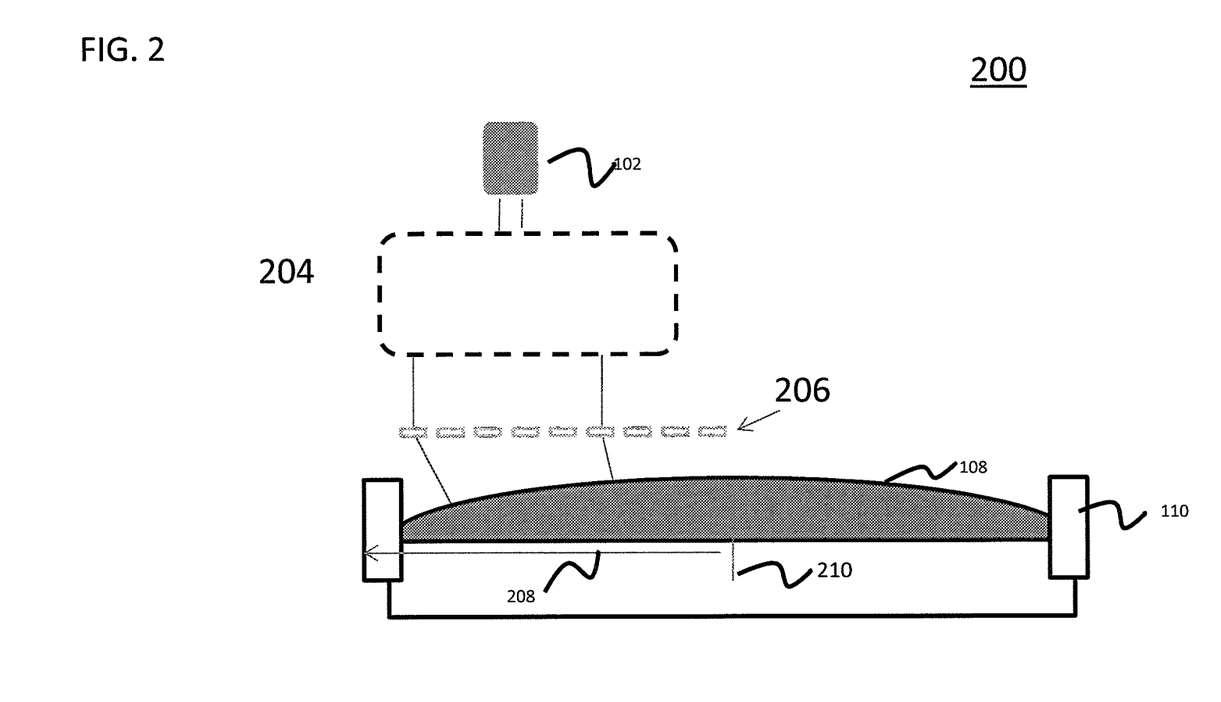
FIG. 2 is a block diagram depicting a side view of a sub-aperture test system, in accordance with an embodiment of the present invention.

FIG. 1b is a side view of another embodiment of the present invention depicting a test system 120. As shown, diverger 103, which is a part of beam expander 104 in FIG. 1a, focuses a collimated beam outputted from interferometer 102 at point 103a, and then diverges and enlarges the beam. Collimating lens 105, which is also part of beam expander 104, collimates the diverged beam that is received from diverger 103. The enlarged collimated beam from collimating lens 105 is then directed towards PHAT 106. In another example, beam expander 104 illuminates only a portion of PHAT 106 (or as shown in FIG. 2, only a portion of PHAT 206 is illuminated).

FIG. 1c provides a side view of a single hologram, designated as 106n, in the array of PHAT 106. The hologram is comprised of a substrate 111 made of glass (for example). The bottom layer of the hologram includes a patterned layer 113. For example, patterned layer 113 may include an etching of segments of circles 113a, as shown in a top view of FIG. 1d. The segments, or arcs of circles are of a predetermined density, typically having a spacing between adjacent segments of 1 micron to 1 mm. The top portion of substrate 111 is shown wedged at a wedge angle 109. The wedge angle helps reduce ghosting effects in the collimated beam.

Figure 1E:
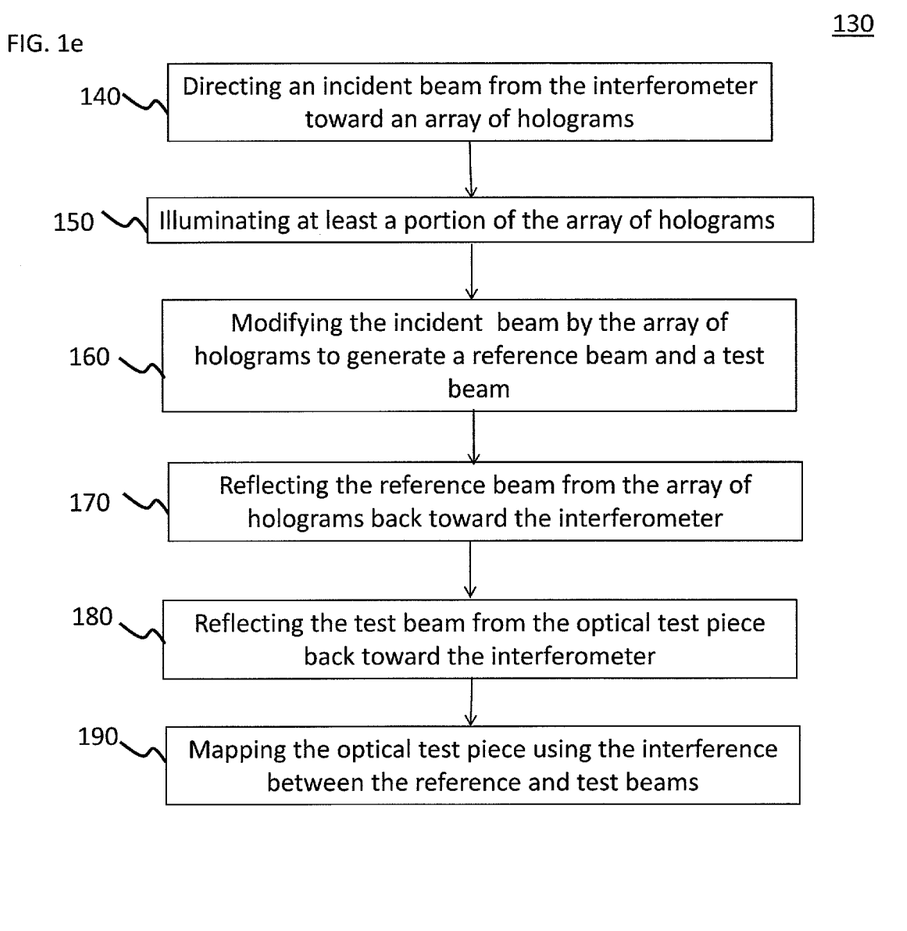
FIG. 1e is a flow-chart of a method for performing test measurements on an optical test piece, in accordance with an embodiment of the present invention.

FIG. 1e presents a flow diagram of a method 130 for testing an optical surface according to an embodiment of the present invention. The method 130 may be better understood by reference to FIG. 1b. The method begins at step 140 and directs an incident beam from interferometer 102 toward PHAT 106. The system may include beam expander 104, as shown in FIG. 1b, for expanding the incident beam. Alternatively, the incident beam may be directly output toward PHAT 106. In that case, step 150 illuminates at least a portion of the array of holograms in PHAT 106. For example, the portion may be a sub-section of the array. Alternatively, the illuminated beam may cover the entire array of PHAT 106.

At step 160, the method modifies the incident beam by using the array of PHAT 106 to form a reference beam and a test beam. The reference beam is the beam that is reflected back from the array of holograms, whereas the test beam impinges on optical test piece 108 and then is reflected back, through the array of holograms, toward the interferometer. The wavefront of the test beam may include an aspheric wavefront formed by a first order diffraction power carrier, as described earlier.

At step 170, the reference beam is reflected from the array of PHAT 106 back to interferometer 102. At step 180, the test beam impinges onto and is reflected from optical test piece 108 back to interferometer 102. Thus, both the reference and the test beams are modified by the array of holograms in PHAT 106. Both beams share a common return path back to the interferometer. The reflected beams, therefore, interfere with each other and form interference fringes, thus generating test data. Measurements of the optical test surface may then be performed, by way of step 190, using the interference fringe data.

It will be appreciated that the common optical path traversed by the test and reference beams is advantageous, because alignment errors and atmospheric effects on the test data are reduced.

FIG. 2 depicts a side view of a test system 200 in another embodiment of the present invention. The system 200 illustrates a test system which includes interferometer 102, an optional beam expander 204, PHAT 206 and optical test piece 108, which is held in place by holder 110. The array of holograms in PHAT 206 extends across the full radial extent 208 of optical test piece 108. The test piece 108 has a radial center 210. If the optical test piece includes an active or an operative reflection surface across the entire diameter of the optical surface, then PHAT 206 should preferably cover the entire radius of the optical surface including radial center 210. The interferometer 102 and beam expander 204 are configured to cover at least a portion of the array of holograms in PHAT 206, but need not cover the entire extent of the optical test piece.

Figure 3:
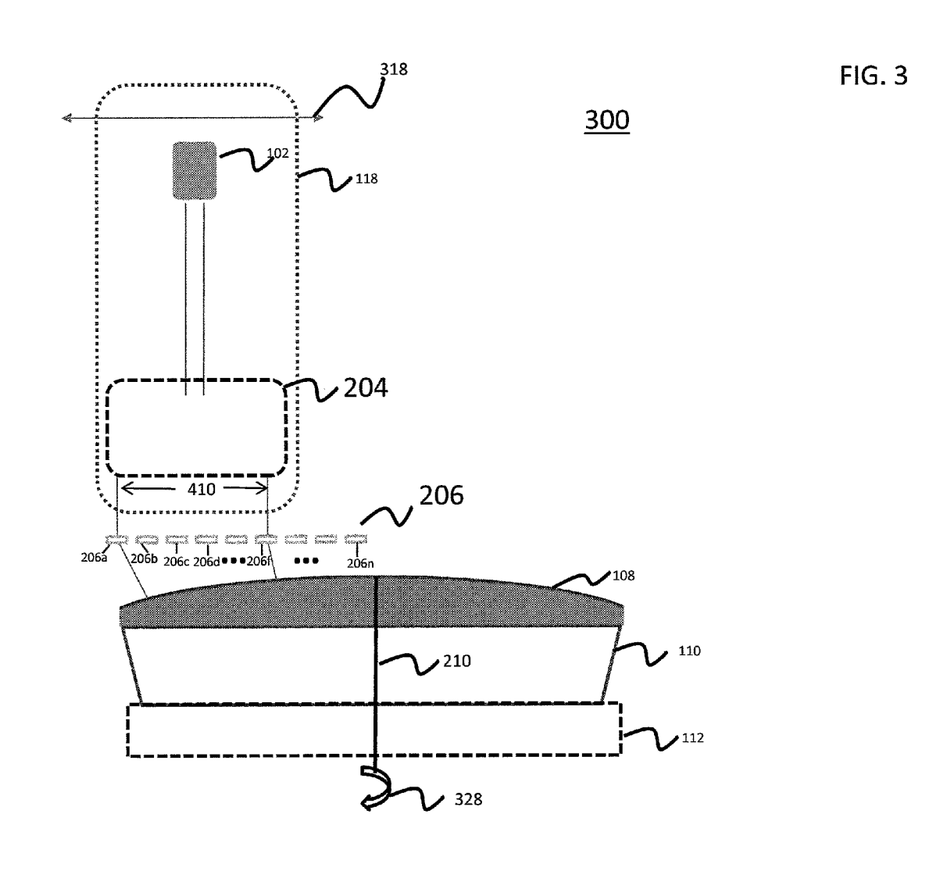
FIG. 3 is a block diagram illustrating a test system having optional rotation and translation stages, in accordance with an embodiment of the present invention.

FIG. 3 illustrates another test system 300 which includes a rotational stage 112 and a translation stage 118, in addition to the components of test system 200 as shown in FIG. 2. The translation stage 118 is configured to allow interferometer 102 and beam expander 204 to have a radial translation along line 318, in order to view the full radial extent of optical test piece 108 and the array of holograms in PHAT 206. The array of holograms in PHAT 206 includes M×N holograms covering at least the radial extent of the optical test piece, spanning from the center of optical test piece 108 to the radial end of the active portion of the test piece. FIG. 3 only shows one row of holograms 206a-206m. Additional rows are shown, for example, in FIG. 4, which includes six rows of holograms. It will be appreciated that the number of rows may be varied by the tester that may impact the sampling of the surface of the optical test piece, for example; the number of columns, however, is determined by the number of holograms required to span the full radial extent of the optical test piece (assuming that the optical test piece has an active reflection surface spanning across its entire diameter). In the example of FIG. 3, nine columns of holograms are required.

In operation, interferometer 102 and beam expander 206 may, for example, illuminate elements 206a-206f of the array of holograms which are a small portion of the entire array shown in FIG. 3. The optical test piece is then rotated by the rotational stage 112, which is configured to rotate about the rotational axis 210. The optical test piece 108 may rotate in a clockwise direction 328, or in a counter-clockwise direction.

In order to test another portion of optical test piece 108, interferometer 102 and beam expander 204 are translated to the right along the direction of line 318 by translator stage 118. In this manner, the beam from beam expander 204 may illuminate holograms 206d-206m and, thereby cover the remaining portion along the radius of the optical test piece. Again, through rotation, the inner portion of the optical test piece is illuminated and tested. It will be appreciated that the linear translation may include an overlap, as described above, by first covering holograms 206a-206f and then covering holograms 206d-206m (for example).

The rotational motion 328 of test piece 108 and the translational motion 318 of interferometer 102 and beam expander 204 are combined by the present invention to perform a complete optical test surface measurement of test piece 108, thereby completely mapping the entire active surface of the optical test piece.

Figure 4:
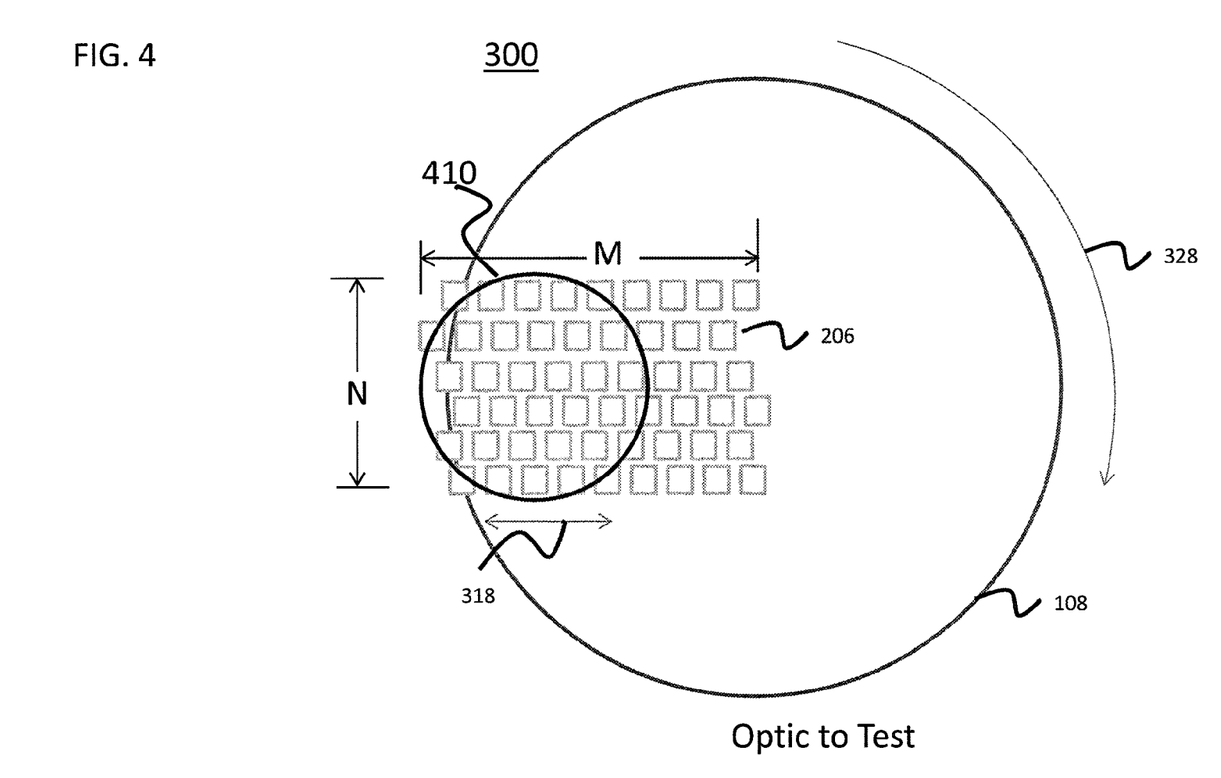
FIG. 4 is a block diagram illustrating a top-view of radial and rotational motions performed by a test system of the present invention.

Turning now to FIG. 4, there is shown a better view of the radial translation and the rotational motion provided by test system 300. As shown, PHAT 206 is overlaid above optical test piece 108. The PHAT includes N×M holograms that may be staggered, as shown. The beam emanating from expander 204 (FIG. 3) has a circular footprint, or a field-of-view (FOV), designated as 410. In the example shown, the PHAT includes 6 rows (N) and 9 staggered columns (M). It will be observed that the 9 columns extend the full radial extent of the optical test piece. Accordingly, as described before, the radial translation is provided by moving footprint 410 along the direction of line 318 and the rotational motion is provided by rotating the optical test piece in a clock-wise direction 328 (for example).

Generally, the holograms of the array are arranged two-dimensionally in a staggered grid, as shown. Each hologram in array 206 is fixed in space relative to its neighbors by placing each hologram in a rigid frame. An example of such a rigid frame is shown as frame 1108 in FIG. 11. The staggered arrangement of the holograms may provide improved data coverage of the optical test piece and improved phase information from the test data.

Although not shown, the holograms of a PHAT may be arranged in a non-staggered manner, in which the columns of one row line-up with the columns of an adjacent row.

Figure 5:
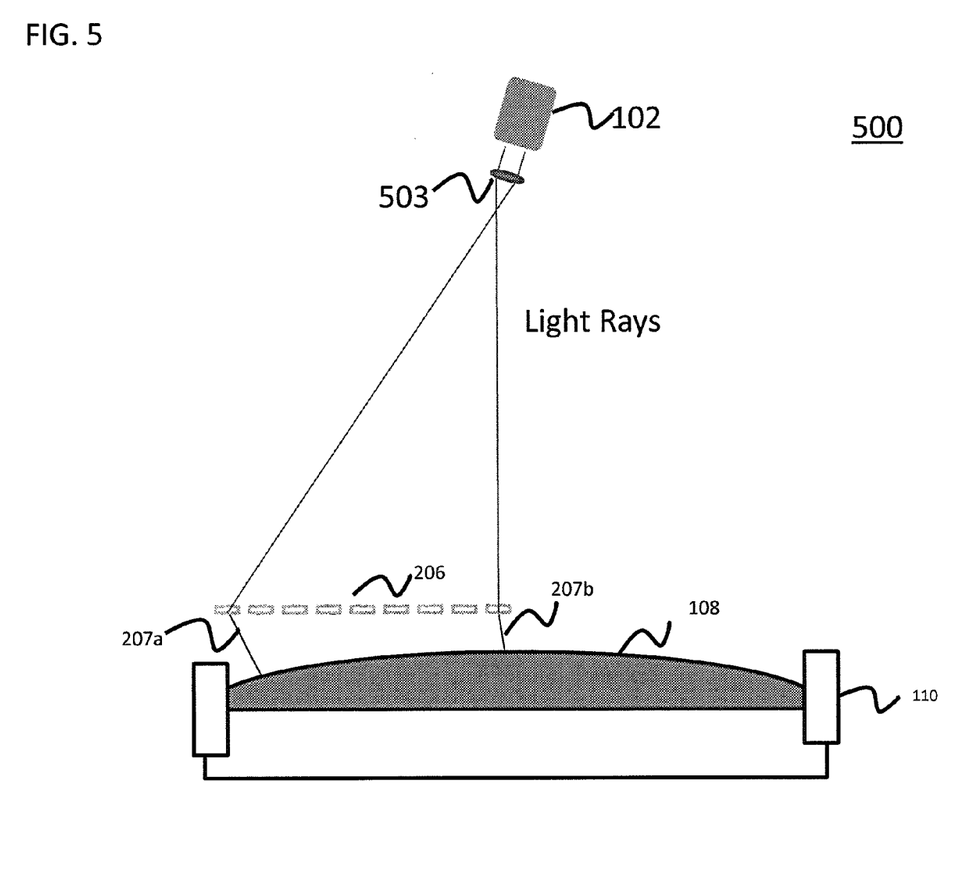
FIG. 5 is a block diagram of a test system including a planar phased holographic array testplate (PHAT), in accordance with an embodiment of the present invention.

In another embodiment of the present invention, a test system 500 is shown in FIG. 5. This embodiment is similar to test system 200 of FIG. 2, except for the beam expander having been replaced with a diverging lens 503. Thus, a diverging incident beam impinges on PHAT 206. The holographic pattern of the array in the PHAT may be configured to provide additional power (focus) to bend the light towards optical test piece 108, as shown by rays 207a,b. Another difference in test system 500 is that interferometer 102 is not perpendicular to the array of holograms, although in one example it may be perpendicular to the array of holograms. In this configuration, axial alignment of interferometer 102 with the optical test piece may be biased.

FIG. 6a depicts another embodiment of the present invention as test system 600a. The diverging lens 603 diverges the incident beam onto the array of holograms, or PHAT 606. The array is conformal to the shape of the optical test piece 608. For example, as shown, the array of holograms 606 follows the spherical convex shape of optical test piece 108. Although each hologram in the array is planar or flat, nevertheless, the array, as a whole conforms to the convex shape of the optical test piece.

Similarly, in another embodiment of the present invention, the array of holograms may be conformal to the surface of a concave optical test piece 628. In such a scenario, the array of holograms 626 conforms to the shape of the optical test piece, as shown in FIG. 6b, although each hologram in the PHAT is planar or flat.

Figure 7:
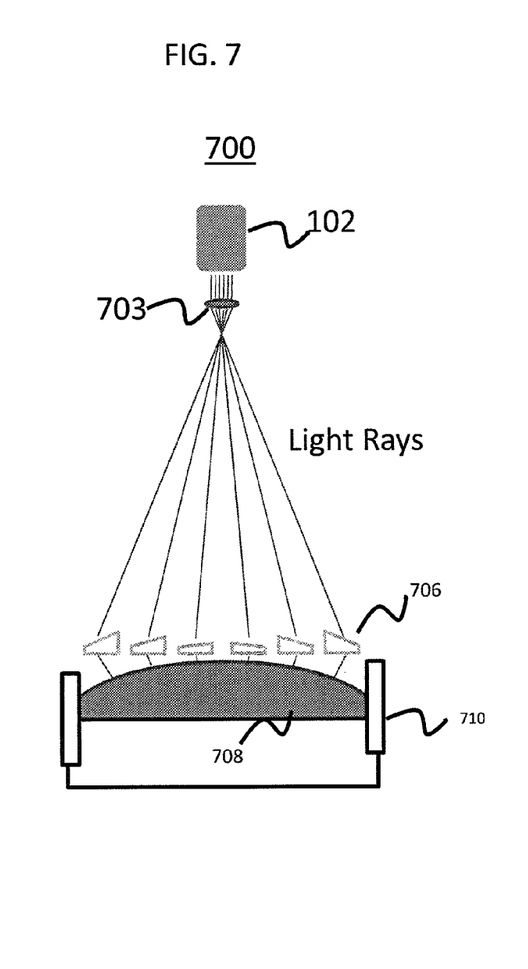
FIG. 7 is a block diagram of a test system including a phased PHAT having wedged CGHs, in accordance with an embodiment of the present invention.

FIG. 7 depicts another embodiment of the present invention, in which a test system 700 includes holograms of PHAT 706, in which each hologram has a wedge or is mated to a wedged lens that is angled at a predetermined slope. For example, at least two different sized wedges are shown in PHAT 706. The inner holograms of the PHAT include a smaller angled wedge, than the angled wedges of the outer holograms, as shown. The rays may then be refracted to a near collimated state before they impinge on the diffracting surface of the holograms. It is contemplated that this configuration is similar to coupling the PHAT with a Fresnel lens. As shown in FIG. 7, the transmitted rays are configured to impinge on the convex surface of the optical test piece at a perpendicular (normal) angle to the convex surface.

Alternatively, the holograms of the PHAT may include other light bending surface profiles. For example, they may be aspheric or spherical and they may also be on one or both sides of each hologram in the array. The surface profiles facilitates bending of the incident beam toward the optical test surface, without a collimating lens (see FIG. 1b), or without additional power in the array of holograms (see FIG. 5), and may be advantageously lower in cost.

Figure 8:
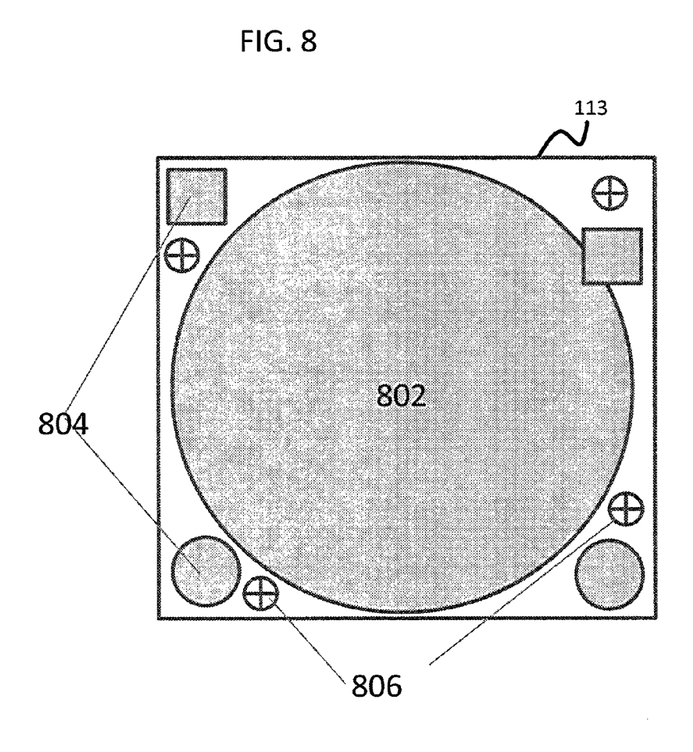
FIG. 8 is a top view of a primary hologram including alignment holograms disposed above a mirror surface under test, in accordance with an embodiment of the present invention.

FIG. 8 is a top view of a complete holographic pattern 113 covering an optical test surface 802. The hologram pattern 113 generates the different diffraction orders described earlier. In addition, holographic pattern 113 includes auxiliary patterns 804, which may be used to align the optical surface to the holographic pattern. Moreover, coordinate measurement targets 806 (for example, cross hairs, retro-reflectors) may be used to pre-align the PHAT. Alternatively, coordinate measurement targets 806 may be used for locating test hardware with the aid of photogrammetry cameras or laser trackers.

Figure 9:
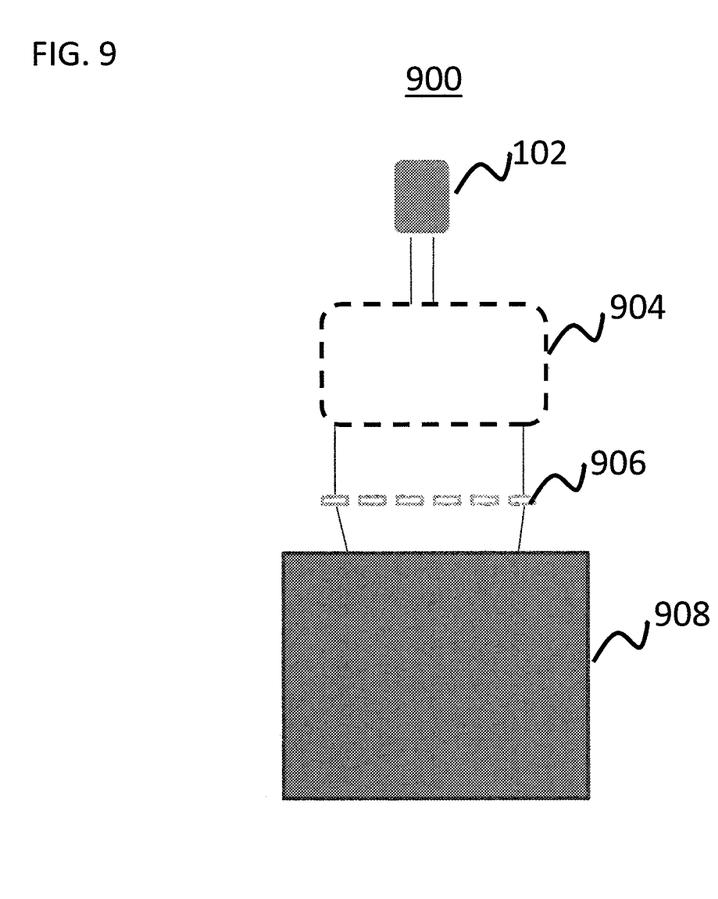
FIG. 9 is a block diagram illustrating a test system for testing optical systems using a PHAT.

FIG. 9 is another embodiment of the present invention depicting a test system 900. The test system includes an interferometer 102, a beam expander 904, an array of holograms 906 and an optical system to test 908. The optical system to test may be comprised of any optical assembly. The test may be carried out according to the method described in FIG. 1e, in which the test beam is reflected from the optical test system and detected by the interferometer. Alternatively, a test may be carried out where a detection is carried out in the optical system to test 908, according to a variation of the method described in FIG. 1e.

Ideally each hologram in the PHAT is phased to each other hologram, such that the PHAT acts as a single large hologram. In addition, the PHAT is aligned to the test system. In practice, however, the alignment may be relaxed so long as the components in the test system are calibrated (as described below) by characterizing any residual alignment errors and fabrication errors. These errors may then processed out of the test data.

Figure 10A:
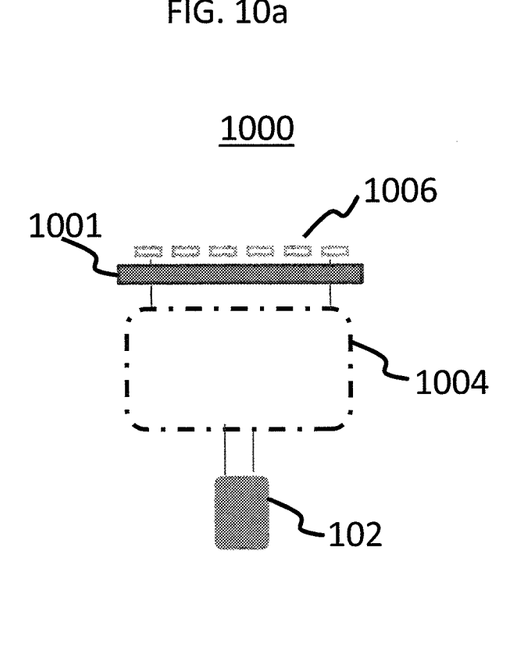
FIG. 10a is a block diagram illustrating a calibration setup for calibrating a reference beam using a PHAT, in accordance with an embodiment of the present invention.

The array of holograms is calibrated for different orders of diffraction. For example, the array of holograms may be calibrated by characterizing the $0^{th}$ order of diffraction for the reference beam. An example of a calibration system is shown in FIG. 10a, identified as system 1000. The system 1000 includes an interferometer 102, a beam expander 1004, an array of holograms 1006 and an optical flat 1001. As described before, for example, Fizeau interferometry may be implemented for calibration and the calibration data may be detected by the interferometer. This may provide a calibration of the reference surface of the PHAT.

The diffracted aspheric wavefront of the PHAT may also be calibrated. The aspheric wavefronts may be characterized in a diffraction order other than the one that is used for testing the optical test piece. For example, a test system may be designed for a first order diffraction. However, the calibration may be performed for a second order diffraction, as the various diffraction orders are quantifiably related.

Figure 10B:
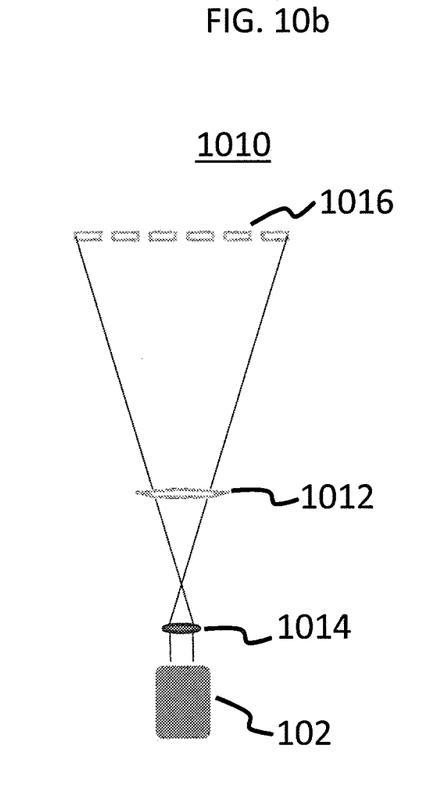
FIG. 10b is a block diagram illustrating a calibration setup for calibrating a test beam using a PHAT, in accordance with an embodiment of the present invention.

As shown in FIG. 10b, a test system 1010 includes an interferometer 102, a diverging lens 1014, an array of holograms 1006 and an aspheric corrector 1012. The aspheric corrector may be required in the calibration test, because the wavefront may have substantial asphericity. The calibration data from the two aforementioned calibration configurations may be combined and used in the calculation of the test data obtained from an optical device under test.

Figure 11:
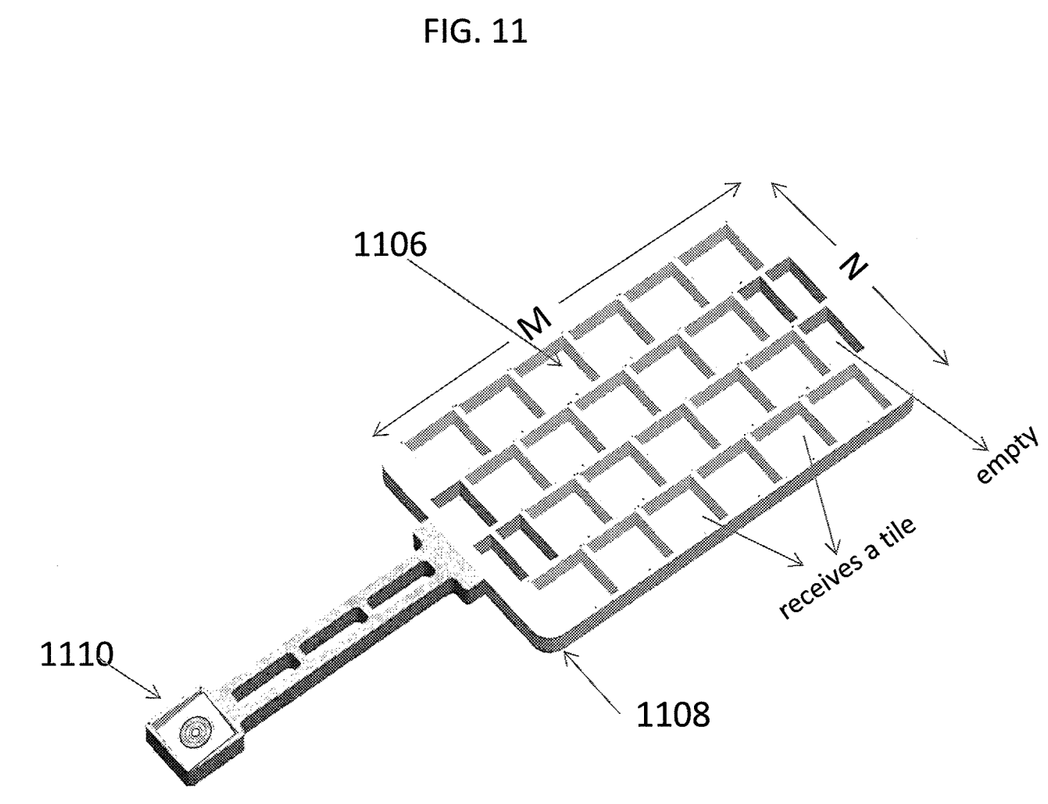
FIG. 11 is a block diagram illustrating a rigid frame for holding the holograms of a PHAT, in accordance with an embodiment of the present invention.

FIG. 11 shows an example of a rigid frame for holding each hologram of a PHAT. For example, the rigid frame includes an M×N openings for receiving the M×N holograms of the PHAT. In addition, the alignment marks 1110, as shown in FIG. 11, may be used to align the PHAT with an axial center of an optical test piece (for example). As such, frame 1108 covers a portion of an optical test piece (not shown) as it extends from the axial center of the optical test piece to a radial portion of the optical test piece (covered by the M×N holograms).

Although the present invention is illustrated and described herein with reference to specific embodiments, the invention is not intended to be limited to the details shown. Rather, various modifications may be made in the details within the scope and range of equivalents of the claims and without departing from the invention.

What is claimed:

1. An apparatus for testing an optical surface comprising:
   an array of holograms, the array including a plurality of individual holograms arranged in an M×N format, in which M is the number of rows and N is the number of columns in the array, and
   the array of holograms positioned between the optical surface and a wavefront sensor,
   wherein the array of holograms reflects a reference beam back to the wavefront sensor, and transmits a test beam to the optical surface, and
   the array of holograms receives the test beam reflected from the optical surface and transfers the test beam back to the wavefront sensor.

2. The apparatus of claim 1 wherein
   the array of holograms includes length and width dimensions, and
   the length dimension includes M holograms of sufficient number to extend a radial dimension of the optical surface, and
   the width dimension includes N holograms, wherein N is at least two rows.

3. The apparatus of claim 1 wherein
   each row is staggered with respect to each adjacent row, and
   a hologram in a first row is positioned between two holograms in an adjacent second row, forming the stagger between the first and second row.

4. The apparatus of claim 1 wherein
   each hologram includes a layer having a pattern of arcs of a circle, and
   a pattern of arcs in one hologram is phased with a pattern of arcs in an adjacent hologram.

5. The apparatus of claim 1 further including:
   a collimating lens for receiving a beam of light emitted from the wavefront sensor, and collimating the beam toward the array of holograms.

6. The apparatus of claim 5 further including:
   a diverger for diverging the beam of light emitted from the wavefront sensor, and
   transmitting the diverged beam of light toward the collimating lens.

7. The apparatus of claim 1 wherein
   the wavefront sensor emits a beam of light of a predetermined field-of-view (FOV), and
   the FOV has a footprint area sized smaller than, or similar to an area formed by the array of holograms.

8. The apparatus of claim 7 further including:
   a linear translational device for moving the FOV of the beam across a radial extent of the optical surface, and
   a rotational device for rotating the optical surface,
   wherein the translational device and the rotational device are configured to position the FOV of the beam across an entire area of the optical surface.

9. The apparatus of claim 1 wherein
   each hologram includes opposing surfaces, and
   a layer on one surface includes a pattern of arcs of a circle, and
   a layer on the opposing surface includes a wedge for reducing ghosting effect.

10. The apparatus of claim 1 wherein one of the following is true:
    the array of holograms is shaped to form a convex surface to match a convex surface of the optical surface, and
    the array of holograms is shaped to form a concave surface to match a concave surface of the optical surface.

11. The apparatus of claim 1 further including:
    a rigid frame having two ends,
    wherein one end includes an M×N array of openings, in which each opening is configured to receive an individual hologram in the array of holograms, and
    another end includes at least one opening configured to receive a hologram having a pattern configured for alignment of the rigid frame to the optical surface.

12. The apparatus of claim 1 wherein
    the wavefront sensor includes a Fizeau interferometer and a Twyman-Greene interferometer.

13. The apparatus of claim 1 wherein
    the wavefront sensor includes a camera for imaging an interference pattern formed by the reference beam and the test beam.

14. An apparatus for testing an optical surface comprising:
an array of holograms, the array including a plurality of individual holograms arranged in a two-dimensional matrix format; and
at least a portion of the array of holograms is illuminated by an incident beam from a wavefront sensor positioned above the array; wherein
the array of holograms modifies the incident beam to a reference beam and reflects back the reference beam to the wavefront sensor; and further modifies the incident beam to a test beam impinging on the optical surface positioned below the array of holograms.

15. The apparatus in claim 14 wherein
the array of holograms is calibrated for a plurality of diffractions orders using at least one of a Fizeau interferometry or a Twyman-Greene interferometry.

16. The apparatus of claim 14 wherein
each hologram includes at least one surface consisting of a plurality of auxiliary patterns for aligning the optical surface with the array, in addition to a pattern of arcs.

17. The apparatus of claim 14 wherein
at least two individual holograms have at least two different sized wedges with predetermined angles for bending the incident beam toward the optical surface.

18. The apparatus of claim 14 wherein
a row of holograms with respect to an adjacent row of holograms in the two-dimensional matrix is at least aligned or staggered.

19. The apparatus of claim 14 is further configured to test an optical system including an optical assembly.

20. The apparatus of claim 14 wherein
the portion of the array being illuminated corresponds to a predetermined field of view (FOV) set by the wavefront sensor.

21. A method for testing an optical surface comprising the steps of:
directing an incident beam from a wavefront sensor toward an array of holograms, the array including a plurality of individual holograms arranged in a two-dimensional matrix format;
illuminating at least a portion of the array of holograms;
modifying the incident beam by the array of holograms to produce a reference beam and a test beam;
reflecting the reference beam from the array of holograms to the wavefront sensor; and
impinging the test beam on the optical surface and reflecting the test beam back to the wavefront sensor.

22. The method of claim 21 further includes a step of mapping the optical surface using interferences between the reference and the test beams.

23. The method of claim 21 further includes a step of calibrating the array of holograms for a plurality of diffraction orders.

* * * * *